(12) United States Patent
Wehrmann et al.

(10) Patent No.: US 8,110,649 B2
(45) Date of Patent: Feb. 7, 2012

(54) POLYCARBONATES COMPRISING CYCLIC OLIGOMERS AND HAVING AN IMPROVED FLOW BEHAVIOR

(75) Inventors: Rolf Wehrmann, Krefeld (DE); Helmut-Werner Heuer, Krefeld (DE)

(73) Assignee: Bayer MaterialScience AG, Leverkusen (DE)

( * ) Notice: Subject to any disclaimer, the term of this patent is extended or adjusted under 35 U.S.C. 154(b) by 0 days.

(21) Appl. No.: 12/919,924

(22) PCT Filed: Feb. 17, 2009

(86) PCT No.: PCT/EP2009/001086
§ 371 (c)(1),
(2), (4) Date: Aug. 27, 2010

(87) PCT Pub. No.: WO2009/106246
PCT Pub. Date: Sep. 3, 2009

(65) Prior Publication Data
US 2011/0003945 A1 Jan. 6, 2011

(30) Foreign Application Priority Data
Feb. 29, 2008 (DE) .......................... 10 2008 011 903

(51) Int. Cl.
*C08G 64/00* (2006.01)
*C08G 63/02* (2006.01)
(52) U.S. Cl. ........................ 528/195; 528/196; 528/198
(58) Field of Classification Search ............... 264/176.1, 264/219; 528/196, 198
See application file for complete search history.

(56) References Cited

U.S. PATENT DOCUMENTS

| 3,022,272 | A | 2/1962 | Schnell et al. |
| 5,235,026 | A | 8/1993 | Wulff et al. |
| 5,340,905 | A | 8/1994 | Kühling et al. |
| 5,349,659 | A | 9/1994 | Do et al. |
| 5,779,986 | A | 7/1998 | van Endert et al. |
| 6,265,525 | B1 | 7/2001 | Kinoshita et al. |
| 6,569,986 | B1 | 5/2003 | Lemmon et al. |
| 6,630,563 | B2 | 10/2003 | Hucks et al. |
| 6,639,043 | B1 | 10/2003 | Lemmon et al. |
| 6,706,848 | B1 | 3/2004 | Prein et al. |
| 7,250,483 | B2 | 7/2007 | Heuer et al. |
| 7,279,544 | B2 | 10/2007 | Hucks et al. |
| 2005/0288407 | A1 | 12/2005 | Heuer et al. |
| 2006/0135735 | A1 | 6/2006 | Meyer et al. |

FOREIGN PATENT DOCUMENTS

| DE | 1031512 B | 6/1958 |
| DE | 1137167 B | 9/1962 |
| DE | 2701173 A1 | 7/1978 |
| DE | 4447422 A1 | 7/1996 |
| EP | 0089801 A1 | 9/1983 |
| EP | 0269324 A2 | 6/1988 |
| EP | 0517044 A2 | 12/1992 |
| EP | 0634445 A1 | 1/1995 |
| EP | 0953605 A2 | 11/1999 |
| EP | 1253163 A1 | 10/2002 |
| EP | 1240232 B1 | 2/2005 |
| EP | 1612231 A1 | 6/2005 |
| EP | 1577333 A2 | 9/2005 |
| EP | 1609818 A2 | 12/2005 |
| GB | 905072 A | 9/1962 |
| GB | 1592724 A | 7/1981 |
| WO | WO-99/28370 A1 | 6/1999 |
| WO | WO-01/02462 A1 | 1/2001 |
| WO | WO-2005/054335 A1 | 6/2005 |
| WO | WO-2006/072344 A1 | 7/2006 |

OTHER PUBLICATIONS

Brunelle, D.J., "Polycarbonates," Encyclopedia of Polymer Science and Technology, pp. 1-33 (2006) [online].

*Primary Examiner* — Terressa Boykin
(74) *Attorney, Agent, or Firm* — Connolly Bove Lodge & Hutz LLP

(57) ABSTRACT

The invention relates to polycarbonates that comprise defect structures and cyclic oligomers and have improved properties. The invention also relates to molded articles and extrudates made from said polycarbonates.

10 Claims, No Drawings

POLYCARBONATES COMPRISING CYCLIC OLIGOMERS AND HAVING AN IMPROVED FLOW BEHAVIOR

RELATED APPLICATIONS

This application is a national stage application (under 35 U.S.C. §371) of PCT/EP2009/001086, filed Feb. 17, 2009, which claims benefit of German Application No. 10 2008 011 903.2, filed Feb. 29, 2008.

The present invention provides compositions with improved rheological and electrical properties, based on polycarbonate with rearrangement structures and reduced content of cyclic oligomers as well as mouldings and extrudates made from these polycarbonate compositions.

The process for polycarbonate synthesis is generally known and is described in numerous publications.

EP-A 0 517 044, WO 2006/072344 and EP-A 1 609 818 and documents cited there describe for example the interfacial polycondensation and the melt process for the production of polycarbonate.

In principle, the production of aromatic oligo- and polycarbonates by the melt transesterification process is known from the literature and previously described in the Encyclopedia of Polymer Science, Vol. 10 (1969), Chemistry and Physics of Polycarbonates, Polymer Reviews, H. Schnell, Vol. 9, John Wiley and Sons, Inc. (1964) as well as in DE-C 10 31 512, U.S. Pat. Nos. 3,022,272, 5,340,905 and 5,399,659.

A disadvantage of polycarbonates that are obtained from the interfacial polycondensation process is that significant proportions of cyclic oligomers are formed as secondary components. Since it is a kinetically controlled process, this naturally cannot be entirely avoided. The resulting cyclic components have a negative effect on the rheological and electrical property profile of the polycarbonates. EP-A 0953605 describes an improvement in flow of polycarbonate compositions with the practical teaching of increasing the proportion of cycles.

Surprisingly, it has now been found that polycarbonate compositions do not exhibit these disadvantages to the same extent and at the same time have lower melt viscosities, i.e. display better flow behaviour and thus improved processing behaviour in injection moulding, as well as improved electrical properties, preferably better insulation, if the content of cyclic oligomers is reduced and, in addition, rearrangement structures which are formed from carbonate structures are present. This is all the more surprising since higher oligomer contents, and not reduced ones, are known to lead to an improvement in flow (cf. EP-A 0953605). In addition, polyfunctional rearrangement structures lead to branchings which normally lead to an increase in melt viscosity and thus to poorer flow. The effect according to the invention could not therefore be expected by the person skilled in the art.

The present invention therefore provides polycarbonates with one or more structures of the general formulae (II) to (V)

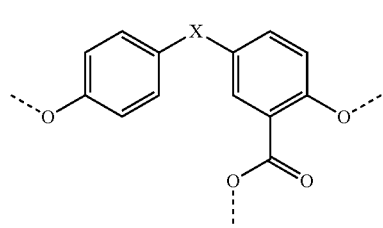
(II)

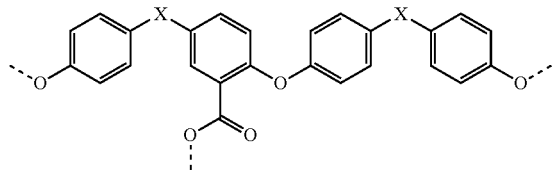
(III)

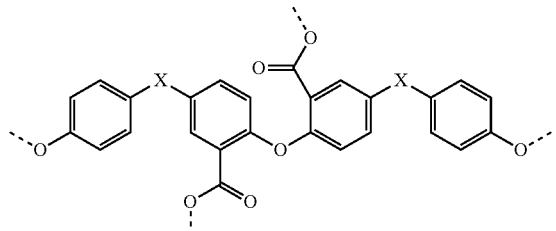
(IV)

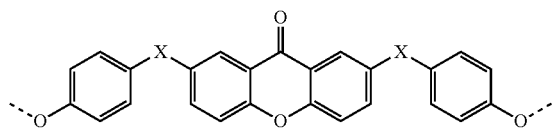
(V)

in which the phenyl rings, independently of one another, may be mono- or disubstituted with $C_1$-$C_8$ alkyl, halogen such as chlorine or bromine, preferably $C_1$-$C_4$ alkyl, particularly methyl, and X has the meaning given for formula (1a), wherein the quantity of the structural units (II) to (V) amounts to a total of 50 to 1210 ppm relative to the base polycarbonate, containing 0.1 to 1.2 wt. %, based on the overall composition, cyclic oligomers of the general formula (I)

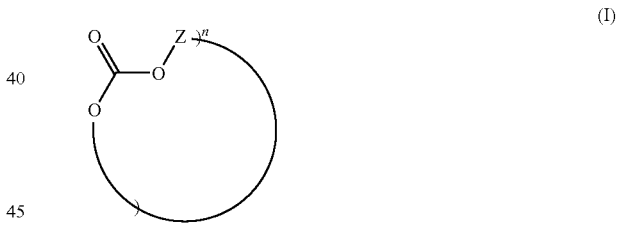
(I)

wherein
n is an integer from 2 to 6 and
Z denotes a group of the formula (1a)

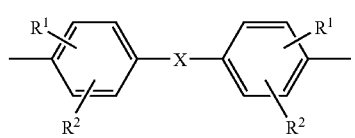
(1a)

in which
$R^1$ and $R^2$ independently of one another denote H, $C_1$-$C_8$ alkyl, preferably H or $C_1$-$C_4$ alkyl, particularly preferably hydrogen or methyl, and
X denotes a single bond, $C_1$ to $C_6$ alkylene, $C_2$ to $C_5$ alkylidene or $C_5$ to $C_6$ cycloalkylidene, which may be substituted with $C_1$ to $C_6$ alkyl, preferably methyl or ethyl.

In the context of the present applications, the structural units of the formulae (II) to (V) are also referred to as rearrangement structures, for the sake of simplicity. The structural units are derived from and result from the diphenol or diphenol mixture used for the production of the polycarbonate. Thus, for example, in the case of bisphenol A as diphenol the phenyl rings of the rearrangement structures are unsubstituted.

The cyclic oligomers of the general formula (I) contained in the polycarbonate compositions according to the invention are preferably contained in quantities of 0.2 to 1.2, particularly preferably 0.2 to 1.1 and especially preferably 0.3 to 1 wt. %. Substantially, i.e. in more than 95% of cases, the cycles contained have ring sizes with n=2 to 6. Ring sizes preferably with n=3 and/or n=4, particularly preferably n=3, occur most frequently.

The rearrangement structures defined above occur in different quantities and ratios to one another. The quantity thereof can be determined by total saponification of the polycarbonate composition.

During breakdown for analytical purposes, the low-molecular-weight degradation products of formulae (IIa) to (Va) characteristic of the respective rearrangement structure are formed, as an example for bisphenol A as diphenol, i.e. X is isopropylidene, the quantity of which is determined by HPLC.

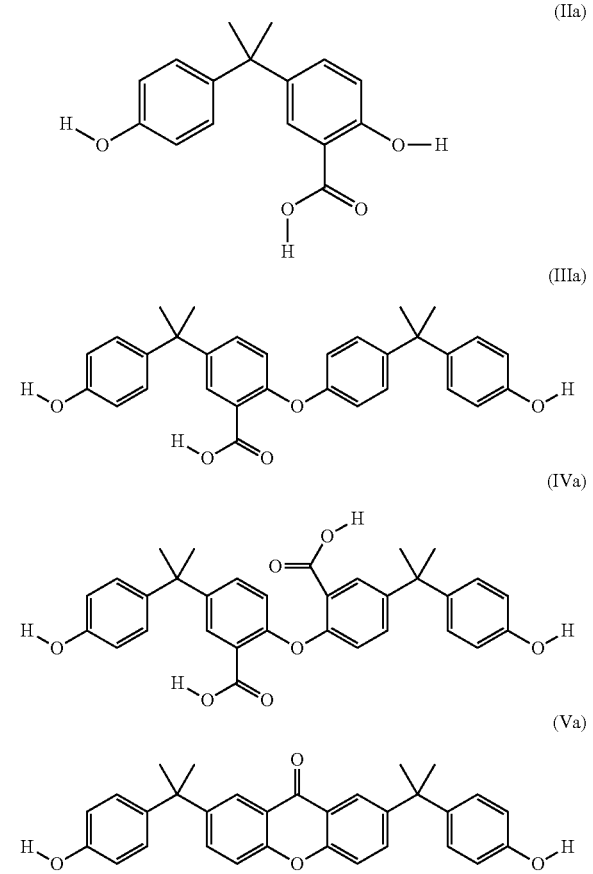

Typically, the quantity of the compound of formula (II) or (IIa) released during this process is from 50 to 800 ppm, preferably from 70 to 750 ppm, particularly preferably from 100 to 700 ppm and especially preferably from 100 to 600 ppm.

Typically, the quantity of the compound of formula (III) or (IIIa) released during this process is 0 (below the limit of detection of <5 ppm) to 100 ppm, preferably from 0 to 80 ppm, particularly preferably from 0 to 70 ppm and especially preferably from 0 to 60 ppm.

Typically, the quantity of the compound of formula (IV) or (IVa) released during this process is 0 (below the limit of detection of <5 ppm) to 60 ppm, preferably from 0 to 50 ppm, particularly preferably from 0 to 40 ppm and especially preferably from 15 to 30 ppm.

Typically, the quantity of the compound of formula (V) or (Va) released during this process is 0 (below the limit of detection of <5 ppm) to 250 ppm, preferably from 5 to 200 ppm, particularly preferably from 5 to 180 ppm and especially preferably from 10 to 150 ppm.

To produce the compositions according to the invention which contain the rearrangement structures and reduced content of cyclic carbonates essential to the invention, aromatic dihydroxy compounds are transesterified in the melt with carbonic acid diesters with the assistance of specific catalysts and optionally other additives.

The polycarbonate compositions with reduced cyclic carbonate contents and rearrangement structures according to the invention are produced by the melt transesterification process from aromatic dihydroxy compounds with carbonic acid diesters in the presence of ammonium or phosphonium salts as catalysts.

For the production of polycarbonates, suitable diphenols are those of the formula (1)

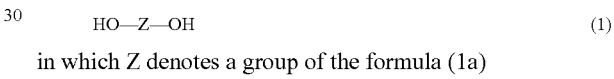

in which Z denotes a group of the formula (1a)

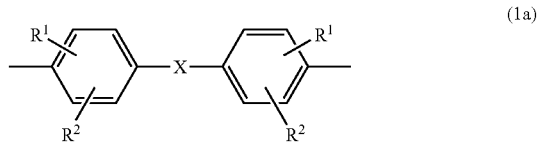

in which
R$^1$ and R$^2$ independently of one another denote H, C$_1$-C$_8$ alkyl or preferably H or C$_1$-C$_4$ alkyl, particularly preferably hydrogen or methyl, and
X denotes a single bond, C$_1$ to C$_6$ alkylene, C$_2$ to C$_5$ alkylidene or C$_5$ to C$_6$ cycloalkylidene, which may be substituted with C$_1$ to C$_6$ alkyl, preferably methyl or ethyl.
X preferably denotes a single bond, methylene, isopropylidene, cyclohexylidene or 3,3,5-trimethylcyclohexylidene, particularly preferably isopropylidene or 3,3,5-trimethylcyclohexylidene.

Examples of these dihydroxyaryl compounds are: dihydroxybenzenes, dihydroxydiphenyls, bis(hydroxyphenyl)alkanes, bis(hydroxyphenyl)cycloalkanes, and the ring-alkylated compounds thereof.

Dihydroxyaryl compounds are generally known or can be produced by generally known processes (e.g. WO 2006/072344, EP-A 1609818 and literature cited therein).

Preferred diphenols of formula (1) are: 2,2-bis(4-hydroxyphenyl)propane, bis(4-hydroxyphenyl)-3,3,5-trimethylcyclohexane and 4,4'-dihydroxydiphenyl.

It is possible to use either one dihydroxyaryl compound, with the formation of homopolycarbonates, or different dihydroxyaryl compounds, with the formation of copolycarbonates. The latter is significant especially when products with particular combinations of properties are to be produced.

Instead of the monomeric dihydroxyaryl compounds, it is also possible to use low molecular-weight, predominantly OH end group terminated oligocarbonates as the starting compound.

The dihydroxyaryl compounds may also be used with residual contents of the monohydroxyaryl compounds from which they were produced, or the low-molecular-weight oligocarbonates may also be used with residual contents of the monohydroxyaryl compounds which were eliminated during the production of the oligomers. The residual contents of the monomer hydroxyaryl compounds may be up to 20%, preferably 10%, particularly preferably up to 5% and especially preferably up to 2% (see e.g. EP-A 1 240 232).

The dihydroxyaryl compounds that are used, like all other raw materials, chemicals and auxiliary substances added to the synthesis, may be contaminated with impurities originating from their own synthesis, handling and storage, although it is desirable, and the aim is, to work with raw materials, chemicals and auxiliary substances that are as clean as possible.

The diaryl carbonates that are suitable for reacting with the dihydroxyaryl compounds are those having the formula (2)

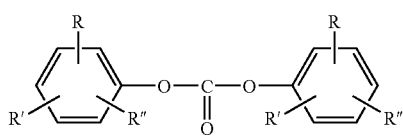

(2)

wherein R, R' and R", independently of one another, can be the same or different and denote hydrogen, optionally branched $C_1$-$C_{34}$ alkyl, $C_7$-$C_{34}$ alkylaryl or $C_6$-$C_{34}$ aryl, R can also mean —COO—R''', wherein R''' denotes hydrogen, optionally branched $C_1$-$C_{34}$ alkyl, $C_7$-$C_{34}$ alkylaryl or $C_6$-$C_{34}$ aryl.

Such diaryl carbonates are described e.g. in EP-A 1 609 818. Preferred diaryl compounds are diphenyl carbonate, 4-tert-butylphenyl phenyl carbonate, di-(4-tert-butylphenyl) carbonate, biphenyl-4-yl phenyl carbonate, di(biphenyl-4-yl) carbonate, 4-(1-methyl-1-phenylethyl)phenyl phenyl carbonate and di-[4-(1-methyl-1-phenylethyl)phenyl]carbonate.

Particular preference is given to diphenyl carbonate.

The diaryl carbonates may also be used with residual contents of the monohydroxyaryl compounds from which they were produced. The residual contents of the monohydroxyaryl compounds may be up to 20%, preferably 10%, particularly preferably up to 5% and especially preferably up to 2%.

Relative to the dihydroxyaryl compound, the diaryl carbonates are generally used in a quantity of 1.02 to 1.30 mol, preferably 1.04 to 1.25 mol, particularly preferably 1.06 to 1.22 mol, especially preferably 1.06 to 1.20 mol per mol of dihydroxyaryl compound. Mixtures of the aforementioned diaryl carbonates may also be used.

A monohydroxyaryl compound that was not used to produce the diaryl carbonate being used may additionally be employed to control or modify the end groups. It is represented by the following general formula (3):

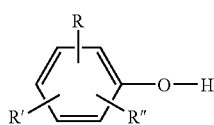

(3)

wherein R, R' and R" have the meaning mentioned for formula (2) with the proviso that, in this case, R cannot be H, but R' and R" can be H.

Such monohydroxyaryl compounds are described e.g. in EP-A 1609818. Phenol or tert. butylphenol is preferred.

A monohydroxyaryl compound should be chosen which has a boiling point higher than that of the monohydroxyaryl compound that was used to prepare the diaryl carbonate employed. The monohydroxyaryl compound may be added at any point during the course of the reaction. It is preferably added at the start of the reaction or at any point during the course of the process. The proportion of free monohydroxyaryl compound can be 0.2-20 mole %, preferably 0.4-10 mole %, based on the dihydroxyaryl compound.

The end groups can also be modified by incorporating a diaryl carbonate, the base monohydroxyaryl compound of which has a higher boiling point than the base monohydroxyaryl compound of the main diaryl carbonate used. Here too, the diaryl carbonate may be added at any time in the course of the reaction. It is preferably added at the start of the reaction or at any point in the course of the process. The proportion of the diaryl carbonate with the higher-boiling base monohydroxyaryl compound relative to the total amount of diaryl carbonate used may be 1 to 40 mole %, preferably 1 to 20 mole % and particularly preferably 1 to 10 mole %.

In the melt transesterification process which is essential to the invention, ammonium or phosphonium salts, referred to below as onium salts, are used as catalysts. Preference is given to the use of phosphonium salts. Phosphonium salts within the meaning of the invention are those of the general formula (4)

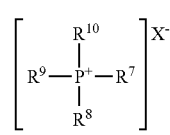

(4)

wherein $R^{7-10}$ can be the same or different $C_1$-$C_{10}$ alkyls, $C_6$-$C_{14}$ aryls, $C_7$-$C_{15}$ arylalkyls or $C_5$-$C_6$ cycloalkyls, preferably methyl or $C_6$-$C_{14}$ aryls, particularly preferably methyl or phenyl, and $X^-$ can be an anion such as hydroxide, sulfate, hydrogen sulfate, hydrogencarbonate, carbonate or a halide, preferably chloride, or an alkylate or arylate of the formula —OR, wherein R can be a $C_6$-$C_{14}$ aryl, $C_7$-$C_{15}$ arylalkyl or $C_5$-$C_6$ cycloalkyl, preferably phenyl.

Particularly preferred catalysts are tetraphenylphosphonium chloride, tetraphenylphosphonium hydroxide and tetraphenylphosphonium phenolate, with tetraphenylphosphonium phenolate being particularly preferred.

They are preferably used in quantities of $10^{-8}$ to $10^{-3}$ mol, based on one mol of dihydroxyaryl compound, particularly preferably in quantities of $10^{-7}$ to $10^{-4}$ mol.

In addition to the onium salt of the type mentioned above, other catalysts may be used as co-catalyst in order to increase the rate of polycondensation.

These include the salts of alkali metals and alkaline earth metals having an alkaline effect, such as hydroxides, alkoxides and aryloxides of lithium, sodium and potassium, preferably hydroxides, alkoxides or aryloxides of sodium. Most preferred are sodium hydroxide and sodium phenolate as well as the disodium salt of 2,2-bis(4-hydroxyphenyl)propane.

The quantities of the salts of alkali metals and alkaline earth metals having an alkaline effect as co-catalyst can be in the range of 1 to 500 ppb, preferably 5 to 300 ppb and most preferably 5 to 200 ppb, calculated as sodium in each case and based on polycarbonate to be formed.

The salts of alkali metals and alkaline earth metals having an alkaline effect can already be used during the production of the oligocarbonates, i.e. at the start of the synthesis, or else can be mixed in only prior to the polycondensation in order to suppress undesirable secondary reactions.

In addition, there is the possibility of adding supplementary quantities of onium catalysts of the same type or of another type prior to the polycondensation.

The catalysts are added in solution to avoid harmful excess concentrations during metering. The solvents are compounds which are inherent to the system and the process, such as e.g. dihydroxyaryl compounds, diaryl carbonates or monohydroxyaryl compounds. Monohydroxyaryl compounds are particularly preferred, because the person skilled in the art is aware that dihydroxyaryl compounds and diaryl carbonates readily change and break down even at slightly elevated temperatures, especially under the influence of catalysts. This negatively affects the quality of the polycarbonates. In the industrially significant transesterification process for the production of polycarbonate the preferred compound is phenol. Phenol is also the logical choice because the preferably used catalyst tetraphenyl phosphonium phenolate is isolated as a mixed crystal with phenol during production.

The weight average molecular weights of the polycarbonates are generally 15,000 to 40,000, preferably 17,000 to 36,000, particularly preferably 17,000 to 34,000 g/mol, and are determined by GPC against a calibration with polycarbonate.

The polycarbonates generally have an extremely low content of cations and anions of less than 60 ppb in each case, preferably <40 ppb and particularly preferably <20 ppb (calculated as Na cation), with cations present being those of alkali metals and alkaline earth metals, which can originate e.g. as contamination from the raw materials used and the phosphonium and ammonium salts. Other ions, such as Fe, Ni, Cr, Zn, Sn, Mo, Al ions and their homologues, can be contained in the raw materials or can arise from abrasion or corrosion of the materials in the plant used. The content of these ions totals less than 2 ppm, preferably less than 1 ppm and particularly preferably less than 0.5 ppm.

Anions present are those of inorganic acids and of organic acids in equivalent quantities (e.g. chloride, sulfate, carbonate, phosphate, phosphite, oxalate, etc.).

Extremely low levels are desirable, which can only be achieved by using the purest raw materials. Such pure raw materials are only obtainable e.g. by purification processes such as recrystallisation, distillation, reprecipitation with washing and similar.

The process according to the invention for the production of polycarbonate by the transesterification process can take place batchwise or continuously. Once the dihydroxyaryl compounds and diaryl carbonates are present as a melt, optionally with other compounds, the reaction is started in the presence of the catalyst which is essential to the invention. The conversion or the molecular weight is increased with rising temperatures and falling pressures in suitable apparatus and devices by withdrawing the monohydroxyaryl compound that separates off until the desired final state is reached. The end groups are characterised in terms of their type and concentration by the choice of the ratio of dihydroxyaryl compound to diaryl carbonate, of the rate of loss of the diaryl carbonate via the vapours resulting from the choice of the method and/or plant for the production of the polycarbonate and of optionally added compounds, such as e.g. a higher-boiling monohydroxyaryl compound.

With regard to the way in which the process is carried out, in which plant and by which method, there are no limitations or restrictions. Furthermore there are no special limitations or restrictions relating to the temperatures, pressures and catalysts used to carry out the melt transesterification reaction between the dihydroxyaryl compound and the diaryl carbonate, and optionally also other reactants added. Any condition is possible, provided that the temperatures, pressures and catalysts selected enable a melt transesterification to be performed with appropriately rapid withdrawal of the monohydroxyaryl compound that separates off.

The temperatures during the entire process are generally 180 to 330° C. under pressures of 15 bar absolute to 0.01 mbar absolute.

A continuous processing mode is usually chosen because it is advantageous for product quality.

The continuous process for the production of polycarbonates is preferably characterised in that one or more dihydroxyaryl compounds with the diaryl carbonate, optionally also with other added reactants with the use of the catalysts, after precondensation without separating off the monohydroxyaryl compound that is formed, the molecular weight is increased to the desired level in a number of reaction-evaporator stages which then follow with temperatures increasing stepwise and pressures reducing stepwise.

According to the course of the process, the suitable devices, equipment and reactors for the individual reaction-evaporator stages are heat exchangers, decompression units, separators, columns, evaporators, stirred vessels and reactors or other commercial equipment which provides the necessary residence time at selected temperatures and pressures. The chosen devices must permit the necessary heat input and be constructed in a manner suitable to cope with the continuously increasing melt viscosities.

All devices are connected to one another by means of pumps, pipes and valves. The pipes between all units should naturally be as short as possible, and the curvature of the pipes kept as low as possible, to avoid unnecessarily extended residence times.

The external, i.e. technical, boundary conditions and requirements for the assembly of chemical plants must be observed.

To perform the process by a preferred continuous processing mode, either the reactants may be melted together or the solid dihydroxyaryl compound may be dissolved in the diaryl carbonate melt or the solid diaryl carbonate in the melt of the dihydroxyaryl compound, or both raw materials are combined as a melt, preferably directly from production. The residence times of the separate melts of the raw materials, in particular that of the melt of the dihydroxyaryl compound, are made as short as possible. The mixture of melts on the other hand, because of the lower melting point of the mixture of raw materials in comparison to the individual raw materials, may reside for longer at correspondingly lower temperatures with no loss of quality.

Subsequently the catalyst, preferably dissolved in phenol, is mixed in and the melt is heated to the reaction temperature. At the start of the industrially significant process for the production of polycarbonate from 2,2-bis-(4-hydroxyphenyl) propane and diphenyl carbonate this is 180 to 220° C., preferably 190 to 210° C., especially preferably 190° C. With residence times of 15 to 90 min, preferably 30 to 60 min, the reaction equilibrium is established without the hydroxyaryl compound that is formed being removed. The reaction may be performed at atmospheric pressure but also, for technical reasons, at overpressure. The preferred pressure in industrial plants is 2 to 15 bar absolute.

The molten mixture is decompressed in a first vacuum chamber whose pressure is set to 100 to 400 mbar, preferably 150 to 300 mbar, and immediately afterwards heated to the inlet temperature again in a suitable device at the same pressure. In the decompression process the hydroxyaryl compound that is formed is evaporated with monomers that are still present. After a residence time of 5 to 30 min in a settling tank, optionally with forced circulation, at the same pressure and the same temperature, the reaction mixture is decompressed in a second vacuum chamber whose pressure is 50 to 200 mbar, preferably 80 to 150 mbar, and immediately afterwards heated to a temperature of 190 to 250° C., preferably 210 to 240° C., particularly preferably 210 to 230° C., in a suitable device at the same pressure. Here too the hydroxyaryl compound that is formed is evaporated with monomers that are still present. After a residence time of 5 to 30 min in a settling tank, optionally with forced circulation, at the same pressure and the same temperature, the reaction mixture is decompressed in a third vacuum chamber whose pressure is 30 to 150 mbar, preferably 50 to 120 mbar, and immediately afterwards heated to a temperature of 220 to 280° C., preferably 240 to 270° C., particularly preferably 240 to 260° C., in a suitable device at the same pressure. Here too the hydroxyaryl compound that is formed is evaporated with monomers that are still present. After a residence time of 5 to 20 min in a settling tank, optionally with forced circulation, at the same pressure and the same temperature, the reaction mixture is decompressed in a further vacuum chamber whose pressure is 5 to 100 mbar, preferably 15 to 100 mbar, particularly preferably 20 to 80 mbar, and immediately afterwards heated to a temperature of 250 to 300° C., preferably 260 to 290° C., particularly preferably 260 to 280° C., in a suitable device at the same pressure. Here too the hydroxyaryl compound that is formed is evaporated with monomers that are still present.

The number of these stages, 4 in this case by way of example, may vary between 2 and 6. If the number of stages is changed, the temperatures and pressures should be adjusted accordingly to give comparable results. The relative viscosity of the oligomeric carbonate achieved in these stages is between 1.04 and 1.20, preferably between 1.05 and 1.15, particularly preferably between 1.06 and 1.10.

After a residence time of 5 to 20 min in a settling tank, optionally with forced circulation, at the same pressure and same temperature as in the last flash/evaporator stage, the oligocarbonate produced in this way is supplied to a disc reactor or basket reactor and condensed further at 250 to 310° C., preferably 250 to 290° C., particularly preferably 250 to 280° C., at pressures of 1 to 15 mbar, preferably 2 to 10 mbar, for residence times of 30 to 90 min, preferably 30 to 60 min. The product achieves a relative viscosity of 1.12 to 1.28, preferably 1.13 to 1.26, particularly preferably 1.13 to 1.24.

The melt leaving this reactor is adjusted to the desired final viscosity or final molecular weight in another disc or basket reactor. The temperatures are 270 to 330° C., preferably 280 to 320° C., particularly preferably 280 to 310° C., the pressure 0.01 to 3 mbar, preferably 0.2 to 2 mbar, with residence times of 60 to 180 min, preferably 75 to 150 min. The relative viscosities are adjusted to the level required for the intended application and are 1.18 to 1.40, preferably 1.18 to 1.36, particularly preferably 1.18 to 1.34.

The function of the two basket reactors may also be combined in one basket reactor.

The vapours from all process stages are immediately drawn off, collected and processed. This processing is generally carried out by distillation in order to obtain high purities in the recovered substances. This may be done for example in accordance with German patent application no. 10 100 404. From an economic and ecological perspective, it is self-evident that the monohydroxyaryl compound that is eliminated should be recovered and isolated in the purest form. The monohydroxyaryl compound may be used directly for the production of a dihydroxyaryl compound or a diaryl carbonate.

The disc or basket reactors are distinguished by the fact that they provide a very large, constantly renewing surface at the vacuum with high residence times. The geometry of the disc or basket reactors is designed according to the melt viscosities of the products. Reactors such as those described in DE 44 47 422 C2 and EP A 1 253 163, or twin-screw reactors such as those described in WO A 99/28 370, are suitable, for example.

The oligocarbonates, even those having a very low molecular weight, and the finished polycarbonates are generally conveyed by means of gear pumps, screws of various designs or specially designed positive-displacement pumps.

Particularly suitable materials for the production of the equipment, reactors, pipes, pumps and fittings are stainless steels of type Cr Ni (Mo) 18/10, such as e.g. 1.4571 or 1.4541 (Stahlschlüssel 2001, publisher: Stahlschlüssel Wegst GmbH, Th-Heuss-Straße 36, D-71672 Marbach) and Ni-based alloys of type C, such as e.g. 2.4605 or 2.4610 (Stahlschlüssel 2001, publisher: Stahlschlüssel Wegst GmbH, Th-Heuss-Straße 36, D-71672 Marbach). Stainless steels are used up to process temperatures of around 290° C. and Ni-based alloys at process temperatures above around 290° C.

Moreover, the polycarbonate obtained may be provided with other conventional additives and fillers (e.g. auxiliary substances and reinforcing materials) to modify their properties after addition of the inhibitors according to the invention. The addition of additives and extenders serves to increase the service life (e.g. hydrolysis or degradation stabilisers), to improve colour stability (e.g. heat and UV stabilisers), to simplify processing (e.g. mould release agents, flow control agents), to improve functional properties (e.g. antistatics), to improve fireproofing, to influence the appearance (e.g. organic colorants, pigments) or to adapt the polymer properties to specific stresses (impact modifiers, finely divided minerals, fibrous materials, silica flour, glass fibres and carbon fibres). They may all be combined in any way to adjust and achieve the desired properties. Such extenders and additives are described for example in "Plastics Additives", R. Gächter and H. Müller, Hanser Publishers 1983.

These additives and extenders may be added to the polymer melt individually or in any mixture or in several different mixtures, directly during isolation of the polymer or after melting of the granules in a so-called compounding stage.

The additives and extenders or mixtures thereof may be added to the polymer melt as a solid, in other words as a powder, or as a melt. Another means of addition is the use of masterbatches or mixtures of masterbatches of the additives or additive blends.

These substances are preferably added to the finished polycarbonate using conventional units but, depending on requirements, they may also be added at a different stage of the polycarbonate production process.

Suitable additives are described for example in Additives for Plastics Handbook, John Murphy, Elsevier, Oxford 1999 or Plastics Additives Handbook Hans Zweifel, Hanser, München 2001.

Suitable heat stabilisers are preferably tris(2,4-di-tert-butylphenyl) phosphite (Irgafos 168), tetrakis(2,4-di-tert.-butylphenyl)[1,1-biphenyl]-4,4'-diyl bisphosphonite, trisoctyl phosphate, octadecyl-3-(3,5-di-tert butyl-4-hydroxyphenyl) propionate (Irganox 1076), bis(2,4-dicumylphenyl)pentaerythritol diphosphite (Doverphos S-9228), bis(2,6-di-tert. butyl-4-methylphenyl)pentaerythritol diphosphite (ADK STAB PEP-36) or triphenylphosphine. They are used individually or in a mixture (e.g. Irganox B900 or Doverphos S-92228 with Irganox B900 or Irganox 1076).

Suitable mould release agents are preferably pentaerythritol tetrastearate, glycerol monostearate, stearyl stearate or propanediol stearate. They are used individually or in a mixture.

Suitable light stabilisers are preferably benzotriazoles, triazines, benzophenones, cyanoacrylates, cinnamates or oxalanilides. They are used individually or in a mixture.

In addition, inhibitors (quenchers) may be added to the polymer melt in pure form, dissolved in an inert solvent or as a masterbatch, in order to deactivate catalyst residues. Suitable inhibitors are acid components such as Lewis or Brönsted acids or esters of strong acids. The pKa value of the inhibitor should not exceed 5 and should preferably be less than 3. The acid component or esters thereof are added to deactivate the reaction mixture, in other words ideally to bring the reaction to a complete standstill. The acid component is added in concentrations of <20 ppm, preferably <10 ppm, particularly preferably <5 ppm and especially preferably ≦2.5 ppm. When the desired molecular weight is reached, the detectable amount of P is in the 1 ppm range. The molar amounts of inhibitor to be used according to the invention, however, are below the residual molar amounts of catalyst that may be assumed from the P value.

Examples of suitable acid components are: ortho-phosphoric acid, phosphorous acid, pyrophosphoric acid, hypophosphoric acid, polyphosphoric acids, benzene-phosphonic acid, sodium dihydrogen phosphate, boric acid, arylboronic acids, hydrochloric acid (hydrogen chloride), sulfuric acid, ascorbic acid, oxalic acid, benzoic acid, salicylic acid, formic acid, acetic acid, adipic acid, citric acid, benzenesulfonic acid, toluenesulfonic acid, dodecylbenzenesulfonic acid and all other phenyl-substituted benzenesulfonic acids, nitric acid, terephthalic acid, isophthalic acid, stearic acid and other fatty acids, acid chlorides such as phenyl chloroformate, stearoyl chloride, acetoxy-BP-A, benzoyl chloride and esters, semi-esters and bridged esters of the aforementioned acids, such as e.g. toluenesulfonic acid ester, phosphoric acid ester, phosphorous acid ester, phosphonic acid ester, dimethyl sulfate, boric acid ester, arylboronic acid ester and other components generating acid under the influence of water, such as triisooctyl phosphate, Ultranox® 640 and BDP (bisphenol diphosphate oligomer).

Preferred examples are ortho-phosphoric acid, phosphorous acid, pyrophosphoric acid, hypophosphoric acid, polyphosphoric acids, benzenephosphonic acid, sodium dihydrogen phosphate, boric acid, arylboronic acids, benzoic acid, salicylic acid, benzenesulfonic acid, toluenesulfonic acid, dodecylbenzenesulfonic acid and all other phenyl-substituted benzenesulfonic acids, acid chlorides such as phenyl chloroformate, stearoyl chloride, acetoxy-BP-A, benzoyl chloride and esters, semi-esters and bridged esters of the aforementioned acids such as e.g. toluenesulfonic acid ester, phosphoric acid ester, phosphorous acid ester, phosphonic acid ester, boric acid ester, arylboronic acid ester and other components generating acid under the influence of water, such as triisooctyl phosphate, Ultranox® 640 and BDP.

Preferred suitable inhibitors are bridged esters of organic sulfur-containing acids, selected from at least one compound a) of the formula (5)

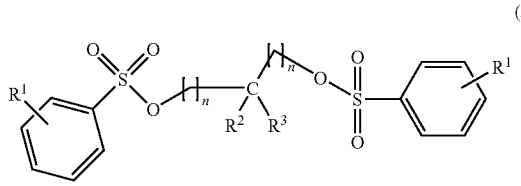

(5)

in which
R$^1$ independently denotes hydrogen or C$_1$-C$_{20}$ alkyl, preferably C$_1$-C$_8$ alkyl, particularly preferably unsubstituted C$_1$-C$_6$ alkyl, especially preferably C$_1$-C$_4$ alkyl, wherein alkyl may be substituted by halogen, especially hydrogen or methyl, R$^2$ and R$^3$ independently of one another denote hydrogen, or C$_1$-C$_6$ alkyl, C$_4$-C$_{30}$ alkylcarboxyl, preferably C$_1$-C$_4$ alkyl, C$_6$-C$_{25}$ alkylcarboxyl, particularly preferably C$_8$-C$_{20}$ alkylcarboxyl, especially hydrogen, C$_{17}$ alkylcarboxyl or C$_{15}$ alkylcarboxyl or denote the group

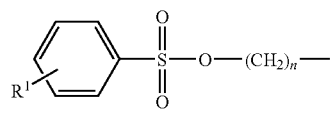

wherein
R$^1$ has the meaning mentioned above,
n denotes an integer from 0 to 8, preferably 0 to 6, especially 0, 1 or 2.

Particularly preferred examples are ortho-phosphoric acid, pyrophosphoric acid, polyphosphoric acids, benzenephosphonic acid, benzoic acid, benzenesulfonic acid, toluenesulfonic acid, dodecylbenzenesulfonic acid and all other phenyl-substituted benzenesulfonic acids and esters, semi-esters and bridged esters of the aforementioned acids such as e.g. toluenesulfonic acid ester, phosphoric acid ester, phosphorous acid ester, phosphonic acid ester and other components generating acid under the influence of water, such as triisooctyl phosphate, Ultranox® 640 and BDP.

Especially preferred examples are ortho-phosphoric acid, pyrophosphoric acid, benzenesulfonic acid, toluenesulfonic acid, dodecylbenzenesulfonic acid and all other phenyl-substituted benzenesulfonic acids and esters, semi-esters and bridged esters of the aforementioned acids, such as e.g. toluenesulfonic acid ester and phosphoric acid ester.

Especially preferred is the following inhibitor of formula (6):

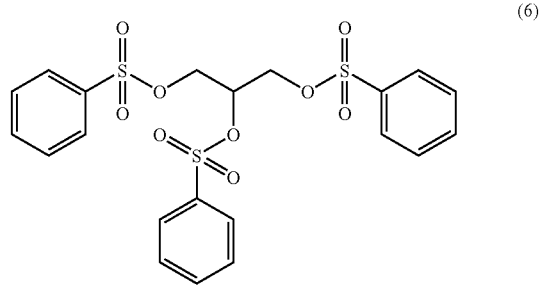

(6)

The acid components may be added in solid, liquid or gaseous form. In a preferred method, the acid component is added continuously and homogeneously to the product stream to be freed from monomers in the production process directly after the desired final molecular weight is achieved, in order to begin evaporating the residual monomers immediately thereafter. In a particularly preferred method, the addition of additives to improve individual product properties takes place after addition of the acid and residual monomer reduction and is not combined with the residual monomer reduction step, because additives are often used that are volatile in the vacuum that is essential for reduction of the residual monomers and they are then difficult to establish in the necessary concentrations in the polymer.

The acid components are preferably added in liquid form. Since the amounts to be metered are very small, solutions of the acid components are preferably used.

Suitable solvents are those that do not negatively affect the process, are chemically inert and evaporate quickly.

Examples of suitable solvents are all organic solvents with a boiling point under normal pressure of 30 to 300° C., preferably 30 to 250° C. and particularly preferably 30 to 200° C. and also water—including water of crystallisation. Those compounds that occur in the respective processes are preferably selected. Depending on the range of requirements for the product to be produced, any residual amounts do not reduce the quality.

Solvents in addition to water are alkanes, cycloalkanes and aromatics, which may also be substituted. The substituents may be aliphatic, cycloaliphatic or aromatic radicals in various combinations and halogens or a hydroxyl group. Heteroatoms, such as e.g. oxygen, may also be binding links between aliphatic, cycloaliphatic or aromatic radicals, wherein the radicals may be the same or different. Other solvents may also be ketones and esters of organic acids, and cyclic carbonates.

Examples in addition to water are n-pentane, n-hexane, n-heptane and isomers thereof, cyclohexane, toluene and xylene, methylene chloride, ethyl chloride, ethylene chloride, chlorobenzene, methanol, ethanol, propanol, butanol and isomers thereof, phenol, o-, m- and p-cresol, diethyl ether, dimethyl ketone, polyethylene glycols, polypropylene glycols, ethyl acetate, ethylene carbonate and propylene carbonate.

Water, phenol, propylene carbonate, ethylene carbonate and toluene are preferably suitable for the polycarbonate process.

Water, phenol and propylene carbonate are particularly preferably suitable.

Static mixers or other mixers leading to a homogeneous incorporation, such as e.g. extruders, are suitable for the effective incorporation of the inhibitor.

The present application also provides extrudates and mouldings, especially those for use in the transparent sector, which are obtainable from the compositions according to the invention.

Areas of application may be: safety glass, helmet visors, films, blow mouldings such as, among other things, water bottles, translucent sheets, such as solid sheets or in particular cellular sheets, e.g. for covering buildings such as stations, greenhouses and lighting systems, traffic light housings or road signs, foams with an open or closed, optionally printable surface, threads and wires (see also DE-A 11 37 167), lighting technology applications, optionally using glass fibres for applications in the translucent sector, translucent formulations with a content of barium sulfate and or titanium dioxide and or zirconium oxide or organic polymeric acrylate rubbers (EP-A 0 634 445, EP-A 0 269 324) for the production of transparent and light-scattering mouldings, precision injection mouldings, such as holders, e.g. lens holders; in this case polycarbonates are optionally used with glass fibres and an optional additional content of 1-10 wt. % molybdenum disulfide (based on the overall moulding composition), optical parts, especially lenses for photographic and movie cameras (DE-A 27 01 173), light transmission carriers, in particular light conductor cables (EP-A 0 089 801) and lighting strips, electrical insulation materials for electrical conductors and for plug housings and plug connectors, and also capacitors, mobile telephone housings, network interface devices, housings for hard disks and data storage systems, carrier materials for organic photoconductors, lamps, headlamps, light diffuser plates or internal lenses, medical applications such as oxygenators, dialysers, foodstuffs applications, such as bottles, kitchenware and chocolate moulds, applications in the automotive sector, such as glazing or in the form of blends with ABS as bumpers, sports equipment such as slalom poles, ski boot buckles, domestic items, such as kitchen sinks, wash basins, mail boxes, housings, such as electrical distribution cabinets, housings for electrical appliances such as toothbrushes, hairdryers, coffee machines, machine tools, such as drills, milling machines, planing machines and saws, washing machine portholes, protective goggles, sunglasses, corrective spectacles and lenses thereof, lamp covers, packing films, chip boxes, chip carriers, boxes for Si wafers and other applications such as feed doors for stalls or animal cages.

EXAMPLES

The relative solution viscosity $\eta_{rel}$ was determined in dichloromethane at a concentration of 5 g/l at 25° C. with an Ubelohde viscometer.

The content of phenolic OH was obtained by IR measurement. For this purpose, a differential measurement was made of a solution of 2 g polymer in 50 ml dichloromethane against pure dichloromethane and the extinction difference determined at 3582 $cm^{-1}$.

The flow behaviour of the polymer melts is determined at various temperatures in a capillary rheometer in accordance with ISO 11443. The polycarbonate samples are previously dried overnight at 130° C. for this purpose.

The specific surface resistance is determined on standard test pieces in accordance with DIN IEC 60093.

Determination of Oligomers (Including Cycles):

The sample is dissolved with methylene chloride. By adding acetone, the majority of the polymer is precipitated. The undissolved portions are filtered off and the filtrate is concentrated to dryness. The dry residue is dissolved with THF and the oligomers are determined by means of HPLC with UV detection.

Determination of Defective Structures (II to V):

The sample is saponified with sodium methylate under reflux. The saponification solution is acidified and concentrated to dryness. The dry residue is dissolved with acetonitrile and the phenolic compounds (IIa to Va) are determined by means of HPLC with UV detection.

The polycarbonate PC1 was prepared as follows in a melt process.

From a recipient vessel, 8,600 kg/h melt mixture consisting of 4,425 kg diphenyl carbonate/h (20.658 mol/h) and 4,175 kg bisphenol A/h (18,287 mol/h) are pumped through a heat exchanger with the addition of 0.52 kg of the phenol adduct of tetraphenylphosphonium phenolate with 65.5% tetraphenylphosphonium phenolate/h (0.786 mol/h; i.e. 0.0043 mole %) dissolved in 4.5 kg phenol/h, heated to 190° C. and passed through a delay column at 12 bar and 190° C. The average residence time is 50 minutes.

The melt is then passed through an expansion valve into a separator, which is under a pressure of 200 mbar. The melt flowing out is heated to 190° C. again in a falling film evaporator which is also under a pressure of 200 mbar and collected in a recipient vessel. After a residence time of 20 minutes the melt is pumped into the next three stages constructed in the same way. The conditions in the $2^{nd}/3^{rd}/4^{th}$ stages are 100/74/40 mbar; 220°/225°/273° C. and 20/10/10 minutes. The resulting oligomer has a relative viscosity of 1.08. All the vapours are passed via pressure regulators into a column which is under vacuum and are discharged as condensates.

The oligomer is then condensed in an attached disc reactor at 280° C. and 3.0 mbar for a residence time of 45 minutes to form a higher-molecular-weight product. The relative viscosity is 1.195. The vapours are condensed.

From the melt stream, which is passed into another basket reactor, a partial stream of 150 kg melt/h is branched off using a gear pump, 150 g of a 5% solution of the quencher of formula 6 in phenol/h are added, the stream is passed through a static mixer with a length-to-diameter ratio of 20 and fed back into the main melt stream. Immediately after bringing the streams together, the added quencher is homogeneously distributed in the overall melt stream using another static mixer.

The melt treated in this way is further subjected to the process conditions in another disc reactor at 290° C., 0.7 mbar and for an average residence time of 120 minutes, discharged and granulated.

The vapours are condensed in the vacuum apparatus and thereafter.

The polycarbonates PC2 and PC3 are prepared in the same way as PC1.

PC4 and PC5 represent comparative examples, in which the polycarbonates (bisphenol A as the diphenol) were prepared by the interfacial polycondensation process.

In the following table 1, the data for the polycarbonate compositions prepared in accordance with the above experiments are reproduced including the proportions of defective structures and cycles established:

Further examples: PC6 to PC13 (bisphenol A as diphenol)

In the same way as the preparation of PC1 to PC3 and PC4 and PC5, other polycarbonates with different viscosities are prepared. The results are compiled in the following table 2.

It can be seen from table 2 that the cycle-containing and rearrangement structure-containing PC6, PC8, PC10 and PC12 each have lower melt viscosities with comparable solution viscosities, even at high shear rates, i.e. better flow behaviour and thus improved processing properties in the injection moulding process, than the comparative products without these structures. This is surprising, since rearrangement structures with higher functionality normally lead to branching and thus to higher melt viscosities.

TABLE 1

|  |  | PC1 | PC2 | PC3 | PC4 comparison | PC5 comparison |
|---|---|---|---|---|---|---|
| $\eta_{rel}$ |  | 1.195 | 1.263 | 1.285 | 1.195 | 1.293 |
| $M_n$*g/mol |  | 7938 | 11048 | 11799 | 7941 | 10865 |
| $M_w$*g/mol |  | 16614 | 24500 | 26820 | 16940 | 28553 |
| Rearrangement structure (IIa) | ppm | 186 | 430 | 304 | <5 | <5 |
| Rearrangement structure (IIIa) | ppm | <5 | 20 | 13 | <5 | <5 |
| Rearrangement structure (IVa) | ppm | <5 | 9 | <5 | <5 | <5 |
| Rearrangement structure (Va) | ppm | 19 | 52 | 43 | <5 | <5 |
| Cycles tot. (I) | % | 0.444 | 0.540 | 0.523 | 1.124 | 1.304 |
| n = 2 | % | 0.002 | 0.002 | 0.002 | 0.000 | 0.001 |
| n = 3 | % | 0.204 | 0.224 | 0.224 | 0.237 | 0.227 |
| n = 4 | % | 0.133 | 0.158 | 0.154 | 0.342 | 0.381 |
| n = 5 | % | 0.077 | 0.098 | 0.090 | 0.297 | 0.361 |
| n = 6 | % | 0.028 | 0.059 | 0.053 | 0.248 | 0.335 |

*determined by GPC, polycarbonate calibration

The results show that the total cycle content in the polycarbonate compositions according to the invention PC1, PC2 and PC3 is significantly reduced in comparison with PC4 and PC5, and rearrangement structures occur.

Furthermore, it is apparent that the polycarbonate compositions PC6, PC8, PC10 and PC12 according to the invention display significantly higher surface resistances and thus have better insulating properties.

Table 2 is as follows:

|  |  | PC 6 | PC 7 comp. | PC 8 | PC 9 comp. | PC 10 | PC 11 comp. | PC 12 | PC 13 comp. |
|---|---|---|---|---|---|---|---|---|---|
| Cycles tot. | % | 0.610 | 1.140 | 0.570 | 1.180 | 0.620 | 1.270 | 0.630 | 1.440 |
| n = 2 | % | 0.002 | 0.001 | 0.002 | 0.001 | 0.002 | 0.001 | 0.003 | 0.001 |
| n = 3 | % | 0.240 | 0.230 | 0.230 | 0.250 | 0.240 | 0.280 | 0.250 | 0.290 |
| n = 4 | % | 0.170 | 0.340 | 0.160 | 0.360 | 0.170 | 0.380 | 0.180 | 0.430 |
| n = 5 | % | 0.100 | 0.300 | 0.100 | 0.310 | 0.110 | 0.340 | 0.110 | 0.400 |
| n = 6 | % | 0.094 | 0.270 | 0.070 | 0.270 | 0.100 | 0.270 | 0.095 | 0.320 |
| Rearrangement structures |  |  |  |  |  |  |  |  |  |
| Ia | ppm | 91 | <5 | 363 | <5 | 298 | <5 | 375 | <5 |
| IIa | ppm | 13 | <5 | 56 | <5 | 35 | <5 | 50 | <5 |
| IIIa | ppm | <5 | <5 | 17 | <5 | 12 | <5 | 15 | <5 |
| IVa | ppm | 14 | <5 | 255 | <5 | 103 | <5 | 170 | <5 |
| eta rel |  | 1.257 | 1.255 | 1.282 | 1.285 | 1.295 | 1.293 | 1.317 | 1.323 |
| Melt visc. 280° C. |  |  |  |  |  |  |  |  |  |
| 50 | Pas |  |  | 744 | 742 | 883 | 925 | 1334 | 1542 |
| 100 | Pas | 413 | 468 | 718 | 737 | 837 | 898 | 1247 | 1456 |
| 200 | Pas | 402 | 467 | 670 | 711 | 766 | 839 | 1085 | 1310 |
| 500 | Pas | 356 | 417 | 554 | 593 | 617 | 676 | 813 | 951 |
| 1000 | Pas | 300 | 338 | 425 | 450 | 462 | 499 | 577 | 645 |
| 1500 | Pas | 256 | 283 | 345 | 362 | 370 | 396 | 490 | 500 |
| 5000 | Pas | 129 | 137 | 158 | 164 | 168 | 175 | 250 | 219 |

-continued

|  | | PC 6 | PC 7 comp. | PC 8 | PC 9 comp. | PC 10 | PC 11 comp. | PC 12 | PC 13 comp. |
|---|---|---|---|---|---|---|---|---|---|
| Melt visc. 300° C. | | | | | | | | | |
| 50 | Pas | — | — | — | 412 | — | — | 653 | 752 |
| 100 | Pas | — | — | 359 | 401 | 436 | 470 | 617 | 731 |
| 200 | Pas | 204 | 244 | 348 | 397 | 427 | 459 | 566 | 672 |
| 500 | Pas | 198 | 232 | 309 | 356 | 370 | 403 | 467 | 531 |
| 1000 | Pas | 178 | 205 | 263 | 300 | 305 | 330 | 371 | 448 |
| 1500 | Pas | 163 | 183 | 227 | 258 | 259 | 277 | 312 | 365 |
| 5000 | Pas | 97 | 104 | 121 | 131 | 131 | 136 | 165 | 167 |
| Melt visc. 320° C. | | | | | | | | | |
| 50 | Pas | — | — | — | — | — | — | — | — |
| 100 | Pas | — | — | — | 223 | — | — | 304 | 415 |
| 200 | Pas | 128 | 132 | 190 | 221 | 238 | 262 | 295 | 395 |
| 500 | Pas | 126 | 130 | 178 | 213 | 223 | 246 | 263 | 357 |
| 1000 | Pas | 119 | 123 | 163 | 191 | 193 | 216 | 216 | 301 |
| 1500 | Pas | 112 | 115 | 148 | 173 | 167 | 192 | 194 | 266 |
| 5000 | Pas | 70 | 76 | 91 | 102 | 100 | 108 | 112 | 137 |
| Surface resistance | Ω | 2.30E+17 | 2.20E+17 | 1.90E+17 | 1.60E+17 | 2.30E+17 | 2.10E+17 | 2.10E+17 | 1.70E+17 |

The invention claimed is:

1. A polycarbonate comprising one or more structural units of formulae (II) through (V)

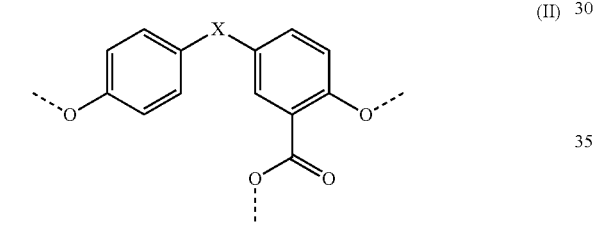

(II)

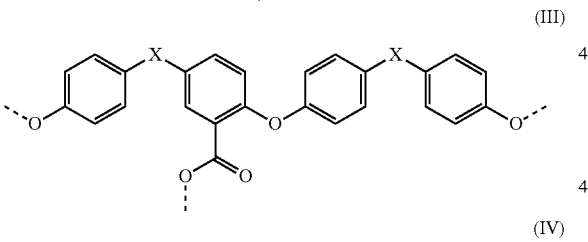

(III)

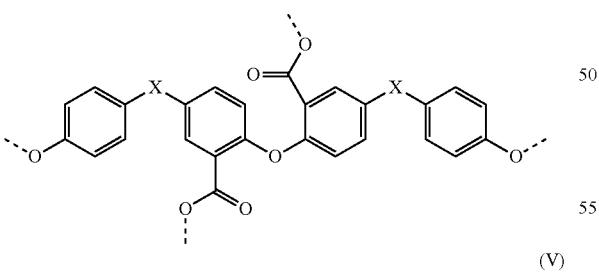

(IV)

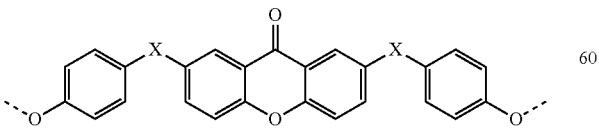

(V)

wherein
the phenyl rings of said one or more structural units of formulae (II) through (V), independently of one another, are optionally mono- or disubstituted with substituents selected from $C_1$ to $C_8$ alkyl and halogen, and X is a single bond, $C_1$ to $C_6$ alkylene, $C_2$ to $C_5$ alkylidene, or $C_5$ to $C_6$ cycloalkylidene, wherein said $C_1$ to $C_6$ alkylene, $C_2$ to $C_5$ alkylidene, and $C_5$ to $C_6$ cycloalkylidene are optionally substituted with $C_1$ to $C_6$ alkyl, wherein the quantity of said one or more structural units of formulae (II) through (V) amounts to a total of from 50 to 1210 ppm relative to the base polycarbonate, comprising from 0.1 to 1.2 weight %, based on the overall composition, of cyclic oligomers of formula (I)

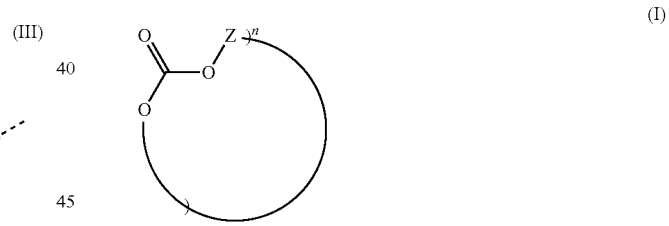

(I)

wherein
n is an integer from 2 to 6, and
Z is a group of formula (1a)

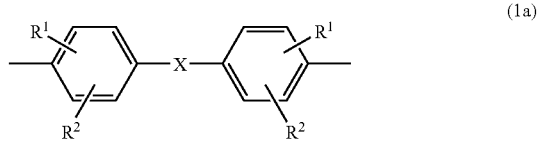

(1a)

wherein
$R^1$ and $R^2$ are, independently of one another, H or $C_1$ to $C_8$ alkyl, and X is a single bond, $C_1$ to $C_6$ alkylene, $C_2$ to $C_5$ alkylidene, or $C_5$ to $C_6$ cycloalkylidene, wherein said $C_1$ to $C_6$ alkylene, $C_2$ to $C_5$ alkylidene, and $C_5$ to $C_6$ cycloalkylidene are optionally substituted with $C_1$ to $C_6$ alkyl.

2. The polycarbonate of claim 1, wherein the quantity of said one or more structural units of formulae (II) through (V) amounts to a total of from 70 to 750 ppm relative to the base polycarbonate.

3. The polycarbonate of claim 1, wherein the quantity of said one or more structural units of formulae (II) through (V) amounts to a total of from 100 to 600 ppm relative to the base polycarbonate.

4. The polycarbonate of claim 1, comprising from 0.2 to 0.8 weight %, based on the overall composition, of cyclic oligomers of formula (I).

5. The polycarbonate of claim 1, wherein the phenyl rings of formulae (I) to (V) are unsubstituted.

6. The polycarbonate of claim 1, wherein X in formulae (II) to (V) is isopropylidene or a single bond.

7. The polycarbonate of claim 1, wherein $R^1$ and $R^2$ are, independently of one another, H or $C_1$ to $C_4$ alkyl.

8. The polycarbonate of claim 1, wherein $R^1$ and $R^2$ are, independently of one another, H or methyl.

9. A compound or blend comprising the polycarbonate of claim 1.

10. A moulding or extrudate comprising the polycarbonate of claim 1.

* * * * *